R. A. KEMPIN.
TOOTHED CHANGE GEAR FOR DRIVING METAL WORKING MACHINES.
APPLICATION FILED JUNE 11, 1919.
1,345,497. Patented July 6, 1920.
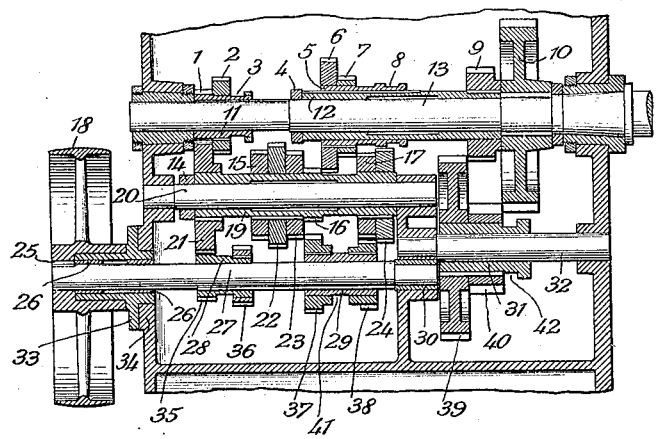
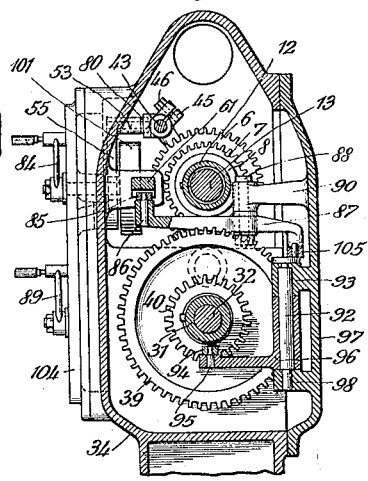
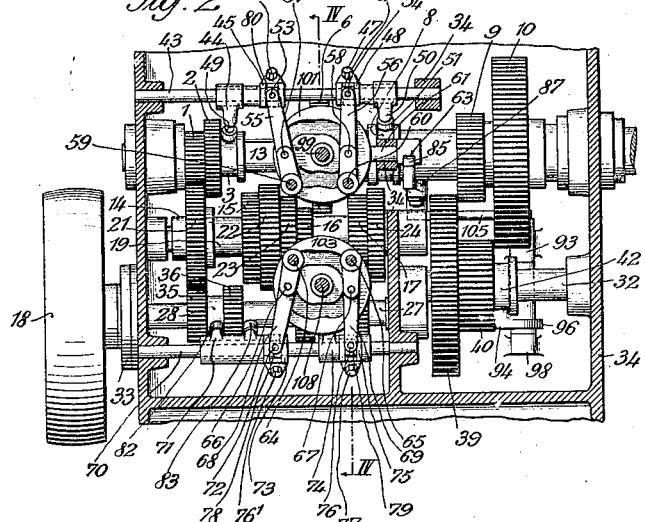
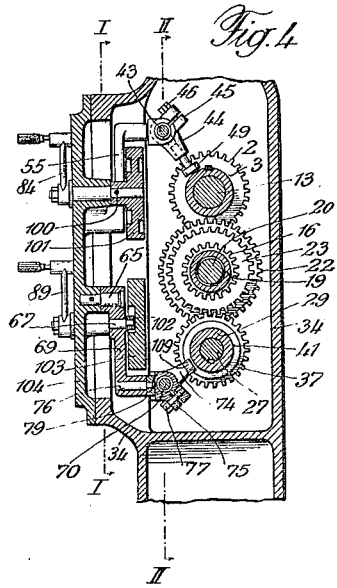
Inventor:
Richard A. Kempin
By
Atty.

UNITED STATES PATENT OFFICE.

RICHARD A. KEMPIN, OF RORSCHACH, SWITZERLAND.

TOOTHED CHANGE-GEAR FOR DRIVING METAL-WORKING MACHINES.

1,345,497. Specification of Letters Patent. Patented July 6, 1920.

Application filed June 11, 1919. Serial No. 303,396.

*To all whom it may concern:*

Be it known that I, RICHARD A. KEMPIN, a citizen of the Republic of Switzerland, residing at Rorschach, Switzerland, have invented certain new and useful Improvements in Toothed Change-Gears for Driving Metal-Working Machines; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in toothed change-gears for driving metal working machines and particularly adapted to be used for the drive of milling machines of middle size.

The object of this invention is to provide a toothed change-gear of the kind referred to for imparting to the main spindle of a milling machine a relatively high speed and to considerably simplify the control mechanism for the change-wheels.

The results obtained with milling machines of the newest type have proved that the cutting or working speed of the cutting tools, and consequently the working capacity of the machines, can be considerably increased by designing the milling tools and the milling devices in an appropriate manner and by improving the cooling methods. This involves however an increase of the number of revolutions to be imparted to the working spindle. The milling spindles of machines of middle size of conventional design receive on an average 16 to 400 and 12 to 300 revolutions per minute. The object of this invention is to provide a toothed change-gear that will permit of imparting to the milling spindle 15-600 revolutions per minute.

The invention will now be more particularly described with reference to the accompanying drawing showing by way of example one mode of carrying out the invention. In this drawing:

Figure 1 is a vertical longitudinal section of the toothed change-gear put through the middle of the milling spindle, the controlling mechanism for the single change-wheels of the gear being omitted for the sake of clearness;

Fig. 2 is a section on the line I—I of Fig. 4, the casing being cut on the line II—II of Fig. 4;

Fig. 3 is a section on the line III—III of Fig. 5;

Fig. 4 is a section on the line IV—IV of Fig. 2 and

Fig. 5 is a horizontal section through the gear beneath the milling spindle, the latter and the wheels mounted on it being omitted. The controlling mechanism for the change-gear is cut in Fig. 5 through the middle of the upper cam disk.

The toothed change-gear illustrated in the drawing is adapted to impart to the milling spindle sixteen different speeds. This change-gear receives its drive in a known manner from a pulley 18 mounted to run in a hollow support 33. The latter is fixed to a casing 34. The power is transmitted by a key 25 from the pulley 18 onto the driving shaft 27 running in bushings 26 and 30. To the driving shaft 27 are keyed two sleeves 28 and 29 adapted to be moved in the axial direction of the shaft 27. The sleeve 28 is provided with two toothed rims 35 and 36, and the sleeve 29 is provided with two toothed rims 37 and 38. The toothed rim 35 is formed integral with the sleeve 28, while the toothed rims 36, 37, 38 are designed as wheels rigidly connected to the sleeves 28 and 29 respectively by means of keys.

On a second shaft 20 fixed to the casing 34 is mounted a loose sleeve 19 provided with a toothed rim 16. To the sleeve 19 are fixed six wheels 21, 15, 22, 23, 17 and 24, and against it abuts a fixed collar 14.

By adjusting the toothed sleeves 28 and 29 in the axial direction of the shaft 27, it is possible to bring the wheels 35, 21 and 36, 22 respectively and the wheels 37, 23 and 38, 24 respectively into engagement with one another, so that four different speeds may be imparted to the sleeve 19.

11 designates a sleeve keyed to a spindle 13 and adapted to be displaced in the axial direction of the latter. This sleeve 11 has a toothed rim 1 and to it is also fixed a toothed wheel 2. By displacing this sleeve 11 on the spindle 13, it is possible to bring the toothed rim 1 into engagement with the wheel 21 and the wheel 2 with the wheel 15 respectively, the rotary movement of the sleeve 19 being then directly transmitted to the spindle 13. Thus, the spindle 13 can be driven at eight different speeds, each of which is obtained by means of two sets of gears transmitting the drive from the driving shaft 27 onto the spindle 13. Said speeds correspond to the eight higher speeds with which the spindle 13 is adapted to turn.

On the spindle 13 is mounted moreover a loose hollow shaft 12 kept in its proper position by an adjustable collar 4. Close to the casing 34 and as near as possible to the front end of the spindle 13 is arranged a toothed wheel 10 keyed to said spindle 13. On the hollow shaft 12 is mounted a sleeve 5 keyed to it and adapted to be moved in the axial direction of this shaft 12. To the sleeve 5 are fixed two toothed wheels 6 and 7. The wheel 16 can be thrown into gear with the wheel 6 and the wheel 17 with the wheel 7 by moving the sleeve 5 in the axial direction of the hollow shaft 12. When the wheels 16, 6 and 17, 7 respectively engage with one another, the rotary movement of the hollow shaft 19 will be transmitted to the hollow shaft 12. Thus, it is also possible to impart to the hollow shaft 12, in the same manner as to the sleeve 11 and the spindle 13, eight different speeds, with the very great difference however, that these eight speeds imparted to the hollow shaft 12 are not dependent in any way (as it is usually the case in similar devices of this kind hitherto proposed) on the above mentioned eight high speeds imparted to the spindle 13, but are wholly independent of these speeds, as the hollow shaft 12 receives its drive from a shaft that can be regarded as a countershaft of the spindle 13, i. e. from the hollow shaft 19. Owing to this, the ratio of gear of the wheels 16, 6 and 17, 7 respectively can be so chosen with regard to the ratio of gear of the wheels 21, 1 and 15, 2 respectively that the relative speed of the hollow shaft 12 with regard to the spindle 13 does not interfere with the proper running of the shaft 12 and allows a proper mounting of this shaft 12, i. e. the relative speed of the latter does not exceed 300 revolutions per minute. The rotary movement is transmitted from the hollow shaft 12 onto the spindle 13 by means of the two sets of toothed wheels 9, 39 and 40, 10. To this end the wheel 9 is fixed to the hollow shaft 12. In the casing 34 is mounted a fixed shaft 32 on which is mounted a loose sleeve 31. To the latter are fixed two wheels 39 and 40 adapted to be brought into engagement with the wheels 9 and 10 respectively upon a displacement of the sleeve 31 in the longitudinal direction of the shaft 32. From this it will be seen that eight further different speeds can be imparted to the spindle 13, all of them being obtained by means of four gears transmitting each time the movement from the driving shaft 27 onto the spindle 13. These last mentioned speeds are the eight lower speeds that can be imparted to the spindle 13.

In the toothed change-gears hitherto proposed it has always been the first endeavor to obtain with the smallest possible number of wheels a great number of different speeds of the milling spindle. The gear system according to this invention is based however on quite other principles. The first object aimed at by this invention is to obtain a change-gear in which the spindle can be driven at a relatively high speed. To this end the gear parts 16, 17, 6, 7, 5, 12, 9, 39, 31, 40, 10, which are provided solely for the purpose of imparting to the spindle 13 the eight speeds that are differing mostly from the speed of the driving shaft 27, i. e. the eight lower speeds, receive their motion from a shaft arranged in front of the spindle 13, namely the hollow shaft 19. As a result of this and in contradistinction to all spindle-drives hitherto proposed, it is possible to render the speeds of all intermediate shafts 19, 12, 31 independent of the speeds of the spindle 13 and to choose them so as to prevent any trouble occurring in the bearings in which said shafts are running.

Owing to the peculiar arrangement of the different parts of the gear system according to this invention, the further important result is attained, that the controlling mechanism for the change wheels can be greatly simplified. Each set of toothed wheels 1, 2 and 6, 7 is mounted on a common sleeve 11 and 5 respectively; the change wheels 35, 36 and 37, 38 are mounted in a similar manner on a common sleeve 28 and 29 respectively. These toothed sleeves 5, 11, 28, 29 are the change-over elements and in order to effect a change-over all of them have to be displaced in the same direction and to the same amount. There are two groups of change-over elements 5, 11 and 28, 29 that have to be thrown successively into and out of gear.

In order to prevent any breaking of the teeth, the change-over of the elements belonging to the same group has to be so effected as to prevent under all circumstances a simultaneous throwing into gear of two pairs of wheels belonging to the same group. In other words, while for instance the toothed sleeve 11 is changed over, the toothed sleeve 5 has to remain stationary in its thrown-out position; likewise, the toothed sleeve 29 has to remain stationary and out of engagement when the toothed sleeve 28 is changed over. This peculiar arrangement of the toothed wheel gears permits of actuating the change-over elements of a group, i. e. the toothed sleeves 28, 29 and 11, 5 respectively, by means of a single lever adapted to influence a cam disk which is provided with a single groove and which causes successively and in a positive manner a throwing into and out of gear of the single wheels 35, 36, 37, 38 and 1, 2, 6, 7 respectively. In the most unfavorable case, only two manipulations are therefore required in order to change at will the speed of the milling spindle. The great simplicity of this controlling mechanism is not only due to its peculiar design, but above all to the new system of the spindle-drive and to the peculiar arrangements of its parts. The controlling mechanism will now be more particularly described with reference to the Figs. 2 to 5 of the accompanying drawing.

On each of two bolts 99 and 108 is mounted a cam disk 101 and 103 respectively. Pins 100 prevent a rotary movement of these disks 101 and 103 relatively to the bolts 99 and 108 respectively. The two bolts 99 and 108 are mounted in a common cover plate 104 fixed to the casing 34. To the outer end of the bolts 99 and 108 are fixed cranks 84 and 89 respectively, by means of which the cam disks 101 and 103 can be rotated.

In the cover plate 104 are further mounted four pins 59, 60, 64 and 65 (Fig. 2) on which are pivotally mounted four levers 55, 56, 68 and 69. Each of these levers carries a pin 57 and 58, 66, 67 respectively. On each of the latter is mounted a loose roller 102. The rollers 102 engage with grooves of cam disks 101 and 103 respectively. To the ends of the levers 55, 56, 68, 69 are fixed pins 53, 54, 72 and 76 carrying sliding pieces 80, 81, 78 and 79 respectively. The latter are adapted to run in prismatic guides of clamping sleeves 45, 48, 73 and 75 respectively. These sleeves 45, 48, 73 and 75 are fixed to guide-sleeves 44, 50, 71 and 74 respectively, by means of screws 46, 47, 76′, and 77. The guide sleeves 44, 50, 71 and 74 are provided with projections carrying pins 49, 51, 82, 83 and 109. These pins project into annular grooves 3, 8, 41 and 42 of the toothed sleeves 5, 11, 28 and 29 respectively. The toothed sleeve 28 has two such pins 82 and 83 disposed on opposite sides of the wheel 36. The guide-sleeves 44, 50, 71 and 74 are adapted to slide along rods 43 and 70 fixed to the casing 34.

When the crank 89 is rotated for instance by an eighth of a revolution toward the right, the cam disk 103 presses the lever 68 toward the left into the position shown. The lever 68 then acts by means of the clamping sleeve 73 upon the guide-sleeve 71 and displaces the latter toward the left, so that the wheel 35 is brought into engagement with the wheel 21. While the disk 103 is rotated in the manner referred to, the lever 69 remains stationary, as the portion of the groove of said disk 103 just coöperating with the roller 102 of the lever 69 has a concentric circular shape. The toothed sleeve 29 adapted to be displaced by means of the lever 69 is therefore in its middle position, in which the wheels 37, 23 and 38, 24 are out of engagement. When the cam disk 103 is rotated by a further eighth of a revolution toward the right, the lever 68 is moved toward the right owing to the peculiar shape of the groove of the disk 103, so that the wheels 35 and 21 are thrown out of engagement. Upon a further rotation of the cam disk 103 by an eighth of a revolution toward the right, the groove of said disk 103 presses the lever 68 farther toward the right, so that the toothed wheels 36 and 22 are caused to engage with one another. Upon a still further rotation of the cam disk 103 by an eighth of a revolution toward the right the lever 68 is again moved toward the left, so that the wheels 36 and 22 are then thrown out of gear. The cam disk 103 has now completed one half of a revolution; during all this time the lever 69 has been stationary in its middle position, as that portion of the cam groove of the disk 103 that has been acting during this time upon the lever 69 has the shape of a concentric semicircle.

When the cam disk 103 is rotated farther toward the right by means of the crank 89, the lever 69 is then acted upon in the same manner as it has just been described with regard to the lever 68, the latter remaining thereby stationary in its middle position, as it is now acted upon by the portion of the groove of the cam disk 103 that has the shape of a concentric semicircle. In this position of the lever 68, the wheels 35 and 36 are out of gear. The wheels 37 and 38 are thrown successively into and out of gear by the lever 69. Thus it will be seen, that only one crank 89 is required in order to control by means of the cam disk 103 the two levers 68 and 69, i. e. the toothed sleeves 28 and 29 of the first group. As both these toothed sleeves belong to the same group and have to be displaced to the same amount, the cam grooves controlling the movement of the sleeves 28, 29 also have the same shape so that each change-over element of the group 28, 29 is just moved during a complete revolution of the cam disk by the amount required for throwing it once into and out of gear. The displacement of the change-wheels 35, 36, 38, 37 of the first group is effected successively, positively and continuously, i. e. the different speeds that may be imparted to the spindle 13 can be increased or decreased in a continuous sequence; the change in the speed depends solely on the direction in which the lever 89, and consequently the cam disk 103, is rotated, and the said sequence remains always the same, although the rotation of the lever 89 and of the cam disk 103 respectively is not limited in either direction.

The second control lever 84 is adapted to act in the same manner upon the toothed sleeves 11 and 5 of the second group by means of the cam disk 101. While the spindle 13 receives its movement from the toothed sleeve 11, i. e., when the high speeds are imparted to said spindle 13, the wheels 9, 39, 40, 10 have to be out of gear. The throwing into and out of gear of these wheels can also be effected by means of the cam disk 101. To this end, a second groove is provided on the rear side of the cam disk 101. In this groove runs a roller 107 (Fig. 5) connected by means of a pin 106 to a rod 61 which is movably mounted in a guide of the casing 34. As long as the front side of the cam disk 101 actuates the lever 55 and consequently the toothed sleeve 11, the roller 107 runs on the rear side of the cam disk in a concentric portion of said second groove, so that the rod 61 remains stationary. When the rod 61 is in this position of rest, all the wheels 9, 39, 40, 10 are thrown out of gear.

When the lever 56, and consequently the toothed sleeve 5, is acted upon by the front side of the cam disk 101, the groove on the rear side of the disk 101 acts upon the roller 107, causing thereby a movement of the rod 61. The latter is provided at the other end with a prismatic guide 63 (Fig. 2) into which engages a slide member 85 adapted to pivot about a pin 86 (Fig. 3). This pin 86 is fixed to a double armed lever 87 pivotally mounted on a journal 88. The journal 88 is carried by an arm 90 formed integral with a cover plate 97 having two extensions 93 and 98 in which is pivotally mounted a bolt 92. On the latter is mounted a lever 96, one end of which carries a pin 95 provided with a sliding member 94 engaging with a cylindrical groove 42 of the toothed sleeve 31. The lever 92 is provided at its upper end with an eccentric pin connected by means of a rod 105 to the other end of the lever 87.

When the cam disk 101 is rotated toward the right, so that the lever 56 is also moved in this direction, the rod 61 is simultaneously moved toward the right owing to the influence exerted by the groove provided on the rear side of the disk 101. In consequence of this, the toothed sleeve 31 is moved toward the right and the wheels 39 and 40 are thrown into gear with the wheels 9 and 10 respectively. Thus, when the wheels 17 and 7 are thrown into gear by means of the lever 56, the wheels 9, 39, 40, 10 are also thrown into gear. Thereupon the roller 107 runs in a concentric portion of the groove on the rear side of the cam disk 101 until the lever 56 throws the wheels 16 and 6 out of gear, whereupon the groove on the rear side effects simultaneously a throwing out of gear of the wheels 9, 39, 40, 10.

Thus, it will be seen, that only two manipulations have to be carried out with the two controlling members 84 and 89 in order to move in the required manner the five adjustable toothed sleeves, i. e. in order to vary at will the speed of the spindle within the geometrical progression in which the speeds of said spindle are staging.

What I claim now as my invention is:

1. A toothed change-gear of the character described, comprising a driving shaft, a counter-member, means adapted to transmit the rotary movement of the driving shaft to said member, a spindle for fixing the cutting tool, means adapted to directly transmit the rotary movement of said counter-member to the spindle in order to rotate the latter at high speeds, a member loose on the spindle, means adapted to transmit the rotary movement of said counter-member to the member loose on the spindle, and gearing down means adapted to transmit the rotary movement imparted to the member loose on the spindle to the latter in order to rotate it at different speeds which are all lower than those imparted to the spindle when the latter receives its drive directly from the counter-member.

2. A toothed change-gear of the character described, comprising a driving shaft, two members rotatably connected to the driving shaft and adjustably mounted thereon, each of said members being provided with toothed rims, a counter-member, toothed wheels carried by said counter-member, a hand operated member adapted to successively adjust said two members movably mounted on the driving shaft in order to throw them successively in and out of gear with toothed wheels carried by the counter-member, a spindle for fixing the cutting tool, a member provided with toothed rims and rotatably connected to the spindle and adjustably mounted thereon, a hollow shaft loose on the spindle, a member provided with toothed rims and rotatably connected to the hollow shaft and adjustably mounted on the latter, a hand operated member adapted to successively adjust said member adjustably mounted on the spindle and the member adjustably mounted on the hollow shaft in order to throw successively the toothed rims of said members into and out of gear with the toothed wheels carried by the counter-member, and a gearing down gear adapted to transmit the rotary movement imparted to said hollow shaft to the spindle.

3. A toothed change-gear of the character described, comprising a driving shaft, a countershaft, a member loose on said countershaft, means adapted to transmit the rotary movement of the driving shaft at different speeds to said member, a spindle for fixing the cutting tool, means adapted to directly transmit the rotary movement of the member loose on the countershaft at different speeds to the spindle in order to rotate the latter at different high speeds, a member loose on the spindle, means adapted to transmit the rotary movement of said member loose on the countershaft at different speeds to said member loose on the spindle, and a toothed gear for transmitting the rotary movement imparted to the member loose on the spindle to the latter in order to rotate it at different speeds which are all lower than those imparted to the spindle when it receives its drive directly from the member loose on the countershaft.

4. A toothed change-gear of the character described, comprising a driving shaft, a countershaft, a hollow shaft loose on said countershaft, groups of change-over elements adapted to transmit the drive from the driving shaft to the hollow shaft, a spindle for fixing the cutting tool, a group of change-over elements adapted to directly transmit the rotary movement imparted to the hollow shaft to said spindle, a member loose on the latter, a group of change-over elements adapted to transmit the rotary movement imparted to the hollow shaft to said member loose on the spindle, sets of toothed wheels adapted to transmit the rotary movement imparted to the member loose on the spindle to the latter, a controlling member adapted to bring successively into and out of operation the groups of change-over elements adapted to transmit the drive from the driving shaft to the hollow shaft loose on the countershaft, and a second controlling member adapted to bring successively into and out of operation the group of change-over elements adapted to directly transmit the rotary movement of the hollow shaft to the spindle and the group of change-over elements adapted to transmit the rotary movement of the hollow shaft to the member loose on the spindle, the sequence of the different speeds imparted to the spindle upon an adjustment of said controlling members remaining always the same and the changing of the speeds of the spindle within determinate limits requiring at the most two manipulations of said controlling members.

5. A toothed change-gear of the character described, comprising a driving shaft, change wheels movably mounted on said shaft and adapted to rotate therewith, a countershaft, a member loose on said countershaft, change wheels fixed to said member, means adapted to throw the change wheels adapted to rotate with the driving shaft into and out of gear with change wheels fixed to the member loose on the countershaft, a spindle for fixing the cutting tool, change wheels movably mounted on said spindle and rotatably connected therewith, means for throwing the last mentioned change wheels into and out of gear with change wheels fixed to said member loose on the countershaft, a hollow sleeve loose on said spindle, change wheels movably mounted on said sleeve and rotatably connected therewith, means for throwing the last mentioned change wheels into and out of gear with change wheels fixed to the member loose on the countershaft, and sets of toothed wheels of different diameter adapted to transmit the rotary movement imparted to the hollow sleeve loose on the spindle to the latter.

6. A toothed change-gear of the character described, comprising a driving shaft, two sleeves rotatably mounted on said shaft and adapted to be adjusted in its longitudinal direction, each of said sleeves being provided with toothed rims, a countershaft, a hollow shaft loose on said countershaft, toothed wheels of different diameter fixed to said hollow shaft, a spindle for fixing the cutting tool, a sleeve rotatably connected to said spindle and adapted to be adjusted in its longitudinal direction and provided with toothed rims, a hollow shaft loose on the spindle, a sleeve rotatably connected to the last mentioned hollow shaft and adapted to be displaced in the longitudinal direction of the latter and provided with toothed rims, a gearing down mechanism adapted to transmit a rotary movement of the hollow shaft loose on the spindle to the latter, two pivotally mounted levers, each of which is operatively connected to one of said sleeves adjustably mounted on the driving shaft, a cam-disk adapted to rock said two levers, a handle for rotating the cam-disk, the latter causing upon a complete rotation of it in the one or other direction said levers to throw the toothed rims of the sleeves movably mounted on the driving shaft successively and always in the same sequence into and out of gear with toothed wheels fixed to the hollow shaft loose on the countershaft, two further pivotally mounted levers, one of them being operatively connected to the sleeve movably mounted on the spindle and the other one with the sleeve movably mounted on the hollow shaft loose on the spindle, a second cam-disk adapted to rock said last mentioned two levers, a handle for rotating said second cam-disk, the latter causing upon a complete rotation of it in the one or other direction the last mentioned two levers to throw the toothed rims of the sleeve rotatably connected to the spindle and the toothed rims of the sleeve rotatably connected to the hollow shaft loose on the spindle successively and always in the same sequence into and out of gear with toothed wheels fixed to the hollow shaft loose on the countershaft, and means adapted to be operated by the second cam-disk for throwing the gearing down mechanism into and out of operation.

In testimony that I claim the foregoing as my invention, I have signed my name.

RICHARD A. KEMPIN.